(12) United States Patent
Ignaczak et al.

(10) Patent No.: US 11,512,737 B2
(45) Date of Patent: Nov. 29, 2022

(54) V-CLAMP WITH MORE EVENLY DISTRIBUTED CLAMPING LOAD

(71) Applicant: Norma U.S. Holding LLC, Auburn Hills, MI (US)

(72) Inventors: Brian T. Ignaczak, Rochester, MI (US); David Peterson, Ortonville, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 201 days.

(21) Appl. No.: 16/804,751

(22) Filed: Feb. 28, 2020

(65) Prior Publication Data
US 2020/0277986 A1    Sep. 3, 2020

Related U.S. Application Data

(60) Provisional application No. 62/811,831, filed on Feb. 28, 2019.

(51) Int. Cl.
| F16L 21/06 | (2006.01) |
| F16C 19/04 | (2006.01) |
| F16B 2/08 | (2006.01) |
| F16C 43/06 | (2006.01) |
| F16L 23/10 | (2006.01) |

(52) U.S. Cl.
CPC .............. F16C 19/04 (2013.01); F16B 2/08 (2013.01); F16C 43/06 (2013.01); F16L 21/065 (2013.01); F16L 23/10 (2013.01)

(58) Field of Classification Search
CPC ......... F16L 25/04; F16L 21/06; F16L 21/065; F16L 37/22; F16L 37/32
USPC .......................... 285/337, 367, 420, 407, 419
See application file for complete search history.

(56) References Cited

U.S. PATENT DOCUMENTS

| 2,841,420 | A | 7/1958 | Woolsey et al. |
| 2,842,385 | A | 7/1958 | Webster et al. |
| 3,010,172 | A | 11/1961 | Kaplan |
| 3,019,036 | A | 1/1962 | Stanger |
| 3,861,723 | A | 1/1975 | Kunz et al. |
| 4,225,160 | A * | 9/1980 | Ortloff .................... F16L 23/20 285/408 |
| 5,301,986 | A | 4/1994 | Yehezkeli |

(Continued)

FOREIGN PATENT DOCUMENTS

EP    1600680 A1    11/2005

OTHER PUBLICATIONS

International Search Report and Written Opinion for PCT Application No. PCT/US2012/045477, dated Nov. 26, 2012 (7 pages).

*Primary Examiner* — Aaron M Dunwoody
(74) *Attorney, Agent, or Firm* — Reising Ethington, P.C.

(57) ABSTRACT

A v-clamp is used to join tubular bodies having end flanges in order to form a joint therebetween. Such tubular bodies are employed in heavy-duty and moderate and light-duty applications including, but not limited to, industrial, oil and gas, sewage, agriculture, and automotive applications. The v-clamp can include a band, a closure mechanism, and a set of bearings. The v-clamp may furnish a more evenly and uniformly distributed clamping force around a circumference of the v-clamp and to the tubular body end flanges than previously demonstrated.

16 Claims, 3 Drawing Sheets

(56) References Cited

U.S. PATENT DOCUMENTS

| | | | |
|---|---|---|---|
| 5,549,449 A * | 8/1996 | McInerney | F01D 25/14 384/413 |
| 5,868,442 A * | 2/1999 | Lin | F16L 23/10 285/411 |
| 7,320,485 B2 | 1/2008 | Amendolea et al. | |
| 8,454,056 B2 | 6/2013 | Fernandes et al. | |
| 8,500,174 B2 | 8/2013 | Gibb | |
| 9,194,523 B2 | 11/2015 | Ignaczak et al. | |
| 2006/0202480 A1 | 9/2006 | Cassel et al. | |

* cited by examiner

V-CLAMP WITH MORE EVENLY DISTRIBUTED CLAMPING LOAD

CROSS-REFERENCE TO RELATED APPLICATION

This application claims the benefit of U.S. Provisional Patent Application No. 62/811,831, filed Feb. 28, 2019.

TECHNICAL FIELD

This disclosure relates generally to v-clamps for joining tubular bodies.

BACKGROUND

V-clamps are typically used to join tubular bodies that have end flanges extending outwardly from the main structures of the tubular bodies. These types of tubular bodies are often employed in heavy-duty and moderate and light-duty applications including, but not limited to, industrial, oil and gas, sewage, agriculture, and automotive applications. Previous v-clamps have included an outer band, inner v-profile segments attached to the outer band, and a latch assembly that is used to tighten and loosen the v-clamps. When the v-clamps are tightened on the tubular bodies, the v-profile segments receive the end flanges and radial and axial forces are exerted on the end flanges to establish a fluid-tight joint therebetween.

SUMMARY

In an embodiment, a v-clamp may include a band, a closure mechanism, and a set of bearings. The band extends circumferentially from a first end to a second end. The closure mechanism is situated near or at the first and second ends. The closure mechanism has a fastener. The set of bearings is disposed at a radially-inboard side of the band. Amid tightening of the band by way of the closure mechanism on a pair of tubular body end flanges, the set of bearings makes surface-to-surface rolling contact with outer surfaces of the pair of tubular body end flanges.

In another embodiment, a v-clamp may include a band, a closure mechanism, and a bearing assembly. The band extends circumferentially from a first end to a second end. The band has a basewall. The band has a first sidewall that extends from the basewall. The band has a second sidewall that extends from the basewall. Together, the basewall and the first and second sidewalls generally establish a channel at an underside of the band. The closure mechanism is situated near or at the first and second ends. The closure mechanism brings the first and second ends toward and away from each other in order to tighten and loosen the v-clamp. The bearing assembly is disposed at the band's channel. The bearing assembly includes a first set of bearings, includes a second set of bearings, and includes a cage. The cage carries the first and second set of bearings. In assembly, a first surface-to-surface contact is established between the first set of bearings and an inner surface of the band. And a second surface-to-surface contact is established between the second set of bearings and the inner surface of the band. In use, a third surface-to-surface contact is established between the first set of bearings and a first outer surface of a first end flange. And a fourth surface-to-surface contact is established between the second set of bearings and a second outer surface of a second end flange.

In yet another embodiment, a v-clamp may include a band, a closure mechanism, and a bearing assembly. The band extends circumferentially from a first end to a second end. The band has a basewall. The band has a first sidewall that depends radially-inboard and axially-outward of the basewall. The band has a second sidewall that depends radially-inboard and axially-outward of the basewall. The band has a first terminal end region that depends axially-inward of the first sidewall. The band has a second terminal end region that depends axially-inward of the second sidewall. The closure mechanism is situated near or at the first and second ends. The closure mechanism has a fastener. The bearing assembly is disposed at an underside of the band and is partly or more held in place at the underside by way of the first and second terminal end regions. The bearing assembly includes a first set of bearings, includes a second set of bearings, and includes a cage. The cage carries the first and second set of bearings.

BRIEF DESCRIPTION OF THE DRAWINGS

One or more preferred exemplary embodiments will hereinafter be described in conjunction with the appended drawings, wherein like designations denote like elements, and wherein.

DETAILED DESCRIPTION

With reference to the figures, a v-clamp 10 is presented that furnishes improved clamping force to a first and a second tubular body end flange 12, 14 in order to establish a fluid-tight joint therebetween. The improved clamping force is more evenly and uniformly distributed around a circumference of the v-clamp 10 and to the first and second tubular body end flanges 12, 14 than previously demonstrated. Sliding friction previously experienced amid a tightening action is removed and is superseded by rolling resistance and friction in an embodiment, which in most cases has a lower frictional force compared to sliding. The v-clamp 10 hence translates tightening action to clamping force more efficiently and effectively than some past v-clamps. The v-clamp 10 is suitable for use in heavy-duty, moderate, and light-duty applications including, but not limited to, industrial, oil and gas, sewage, agriculture, and automotive applications. Further, as used herein, the words axially, radially, and circumferentially, and their related grammatical forms, are used in reference to the generally circular and cylindrical shape of the shown v-clamp. In this sense, axially refers to a direction that is generally along or parallel to a central axis of the circular and cylindrical shape, radially refers to a direction that is generally along or parallel to a radius of the circular and cylindrical shape, and circumferentially refers to a direction that is generally along or in a similar direction as a circumference of the circular and cylindrical shape.

Figure 1:
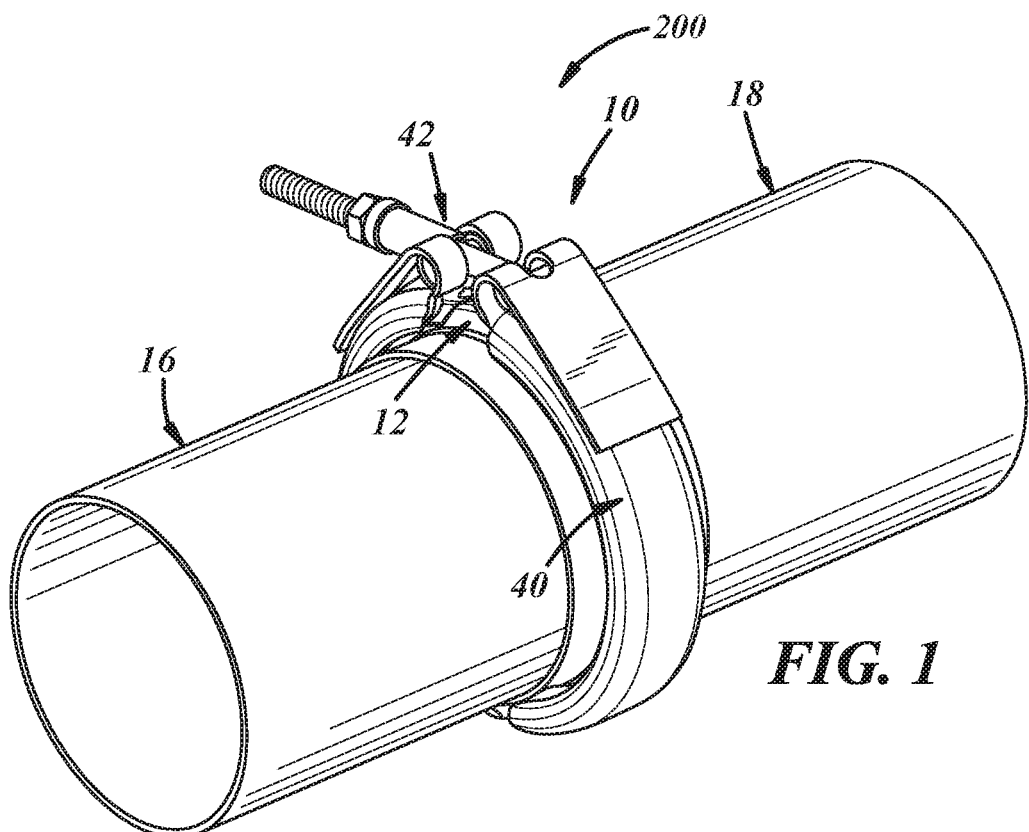
FIG. 1 is a perspective view of an embodiment of a joint assembly with a pair of tubular bodies and a v-clamp.
Figure 4:
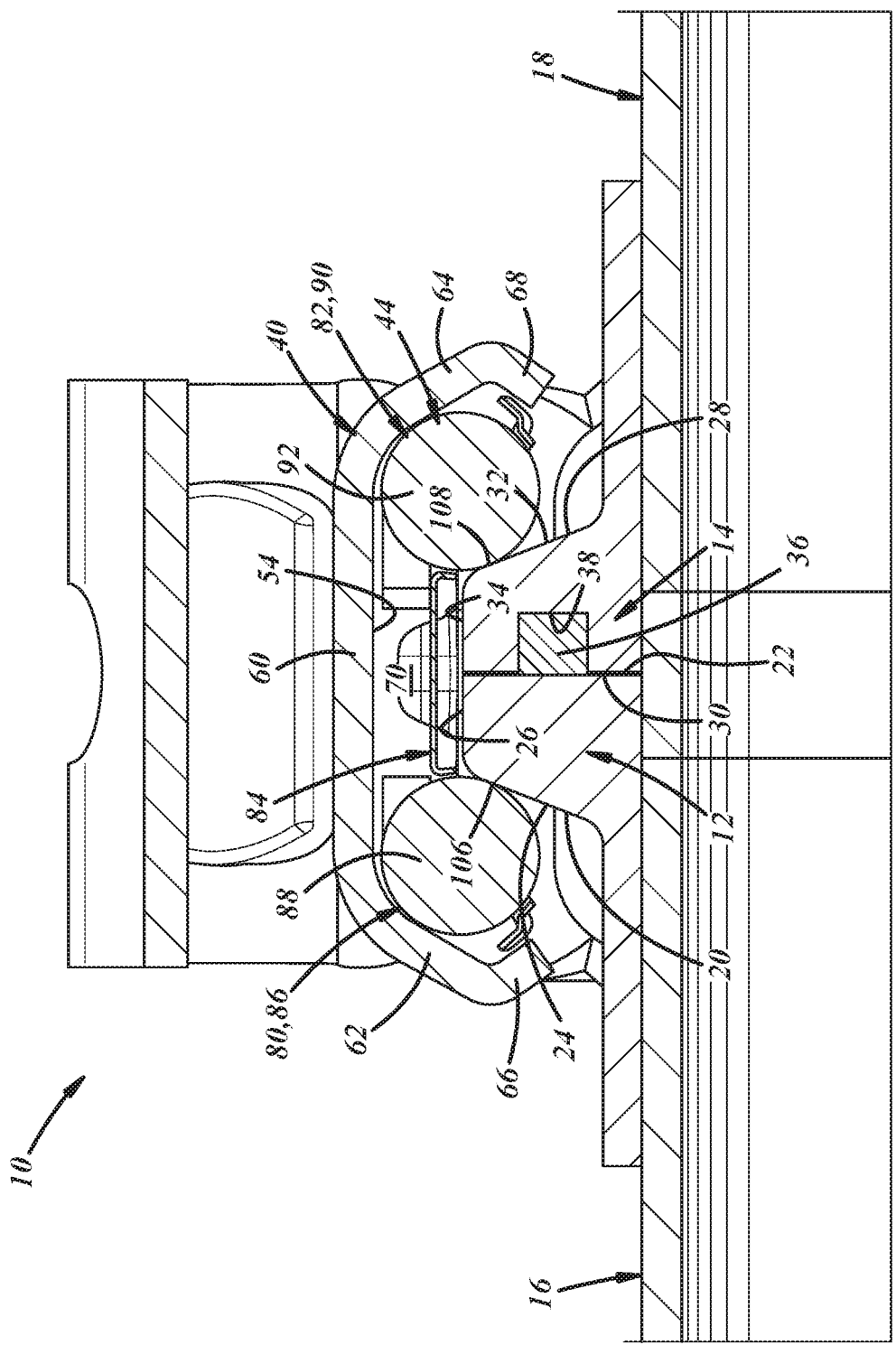
FIG. 4 is a cross-sectional view of the v-clamp of FIG. 2 installed on the pair of tubular bodies.

Referring to FIGS. 1 and 4, the v-clamp 10 can be used in applications involving fluid-flow through a first tubular body 16 and a second tubular body 18. The first tubular body 16 has the first end flange 12, and the second tubular body 18 has the second end flange 14. A joint assembly 200 is constituted by the v-clamp 10 and the first and second tubular bodies 16, 18. The first and second end flanges 12, 14 can be unitary extensions of their respective tubular bodies, or can be initially discrete components that are subsequently attached to the tubular bodies. The first and second end flanges 12, 14 can have various designs, constructions, and components in different examples. In the example of FIGS. 1 and 4, the first and second end flanges 12, 14 span circumferentially around the respective tubular body 16, 18 and span radially outboard of the respective tubular body 16, 18. In assembly and installation, the first and second end flanges 12, 14 come together in closely-abutting or directly-abutting contact. With more particular reference to FIG. 4, the first end flange 12 has a first outer surface 20 and a first inner surface 22. The first outer surface 20 has an axially-outward facing section 24, and has a radially-outboard facing section 26. Likewise, the second end flange 14 has a second outer surface 28 and a second inner surface 30. The second outer surface 28 has an axially-outward facing section 32, and has a radially-outboard facing section 34. Furthermore, in the example presented in FIG. 4, a gasket 36 is seated in a channel 38 defined at the second inner surface 30 of the second end flange 14. The gasket 36 and channel 38 span circumferentially around the second end flange 14. A first fluid-tight seal is established between the gasket 36 and the first inner surface 22 in assembly and application, and a second fluid-tight seal may be similarly established between the first and second inner surfaces 22, 30 upon their abutment in assembly and application.

The v-clamp 10 is set in place over and around the first and second end flanges 12, 14 and is tightened to assist in the establishment of a fluid-tight joint therebetween. The v-clamp 10 can have various designs, constructions, and components in different embodiments; its exact design, construction, and components can be dictated in part or more by the application in which the v-clamp will be employed and the design and construction of the end flanges in which it will be tightened down upon. In the embodiment presented by FIGS. 1-4, the v-clamp 10 includes a band 40, a closure mechanism 42, and a bearing assembly 44. Still, in various embodiments, the v-clamp 10 could include more, less, and/or different components than those of the figures.

Figure 2:
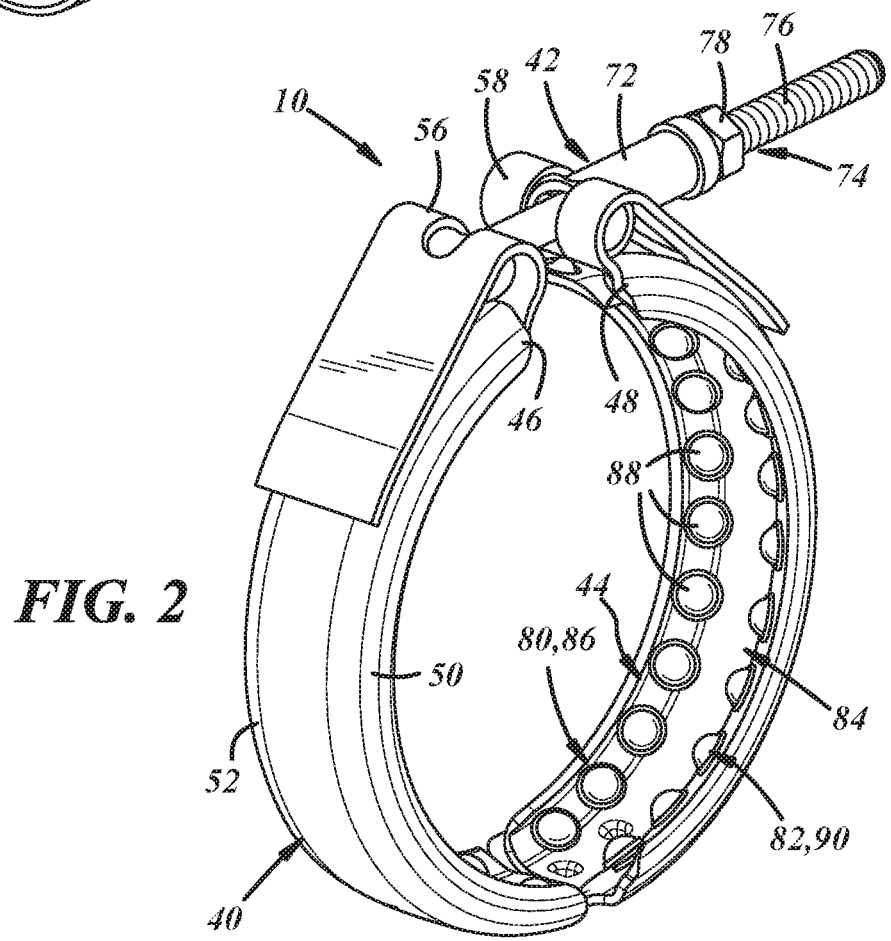
FIG. 2 is a perspective view of an embodiment of the v-clamp.
Figure 3:
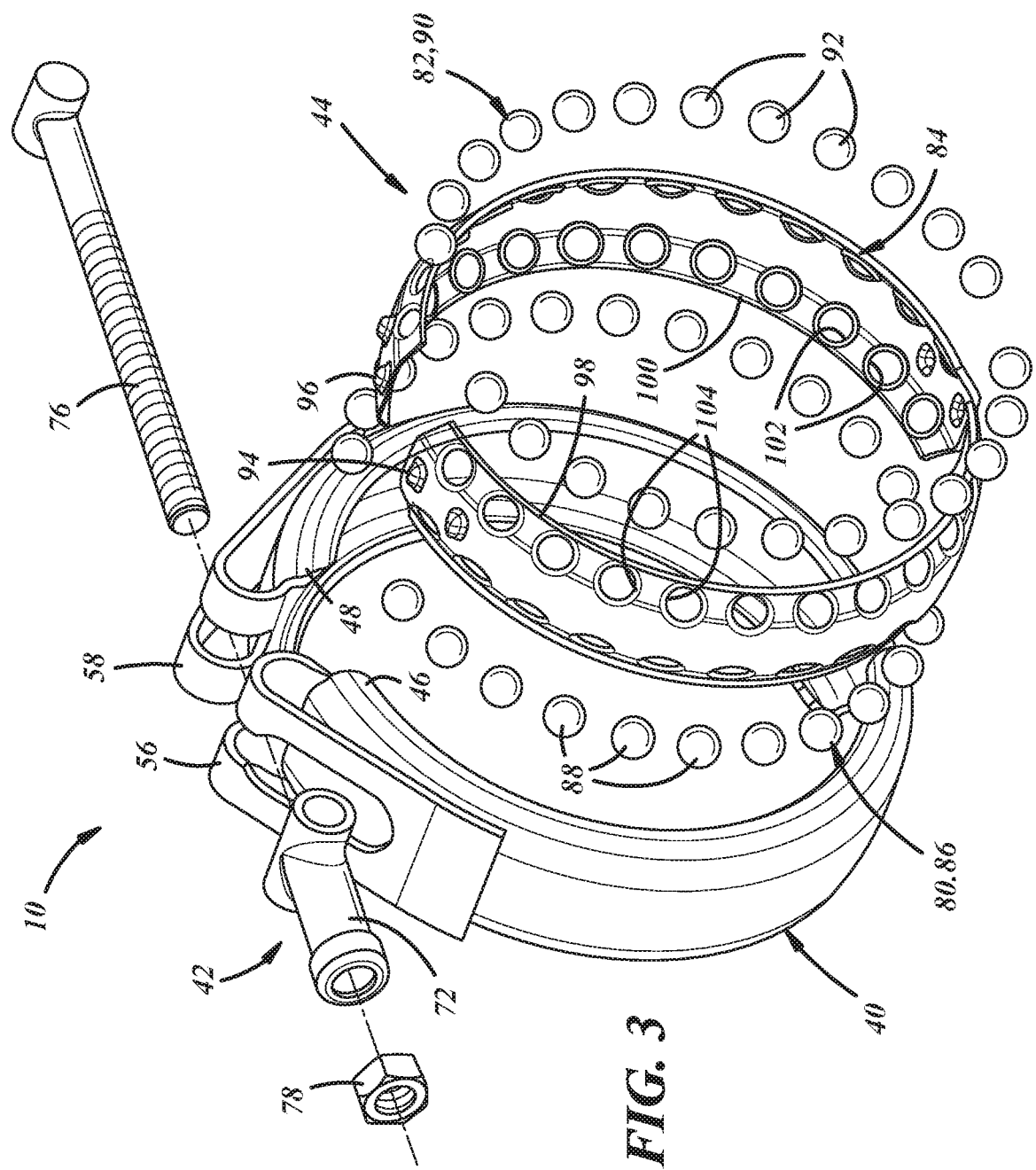
FIG. 3 is an exploded view of the v-clamp of FIG. 2.

The band 40 constitutes the main structure of the v-clamp 10 and carries the bearing assembly 44 when the v-clamp 10 is assembled. The band 40 can be made from a metal material such as stainless steel. The band 40 can take different forms in different embodiments. With reference to FIGS. 2-4, in the example presented here, the band 40 has a first end 46 at one of its circumferential terminations, and has a second end 48 at its other and opposite circumferential termination. At its axial boundaries, the band 40 has a first axial end 50 and a second axial end 52. On a radially-inboard facing side, the band 40 has an inner surface 54. On each of the first and second ends 46, 48, the band 40 has first and second loops 56, 58 that are formed by the band 40 being folded back onto itself and spot-welded in place. Openings defined in the band 40 at the loops 56, 58 present structures that can hold components of the closure mechanism 42. With particular reference to FIG. 4, the band 40 has a basewall 60 and a first and second sidewall 62, 64 extending from the basewall 60. In the embodiment shown, the first sidewall 62 depends radially-inboard and axially-outward of the basewall 60, and likewise the second sidewall 64 depends radially-inboard and axially-outward of the basewall 60. For securing the bearing assembly 44 in place at an underside and a radially-inboard side of the band 40, first and second terminal end regions 66, 68 depend from the first and second sidewalls 62, 64 and project and slant axially-inward relative to the first and second sidewalls 62, 64. Together, these walls of the band 40 generally establish a concave shape when viewed from the interior of the v-clamp 10. A channel 70 is generally defined by the basewall 60 and the first and second sidewalls 62, 64 at the underside of the band 40 and receives the bearing assembly 44 and the first and second end flanges 12, 14 in assembly and installation.

The closure mechanism 42 is used to tighten and loosen the v-clamp 10 and bring the first and second ends 46, 48 toward and away from each other. The closure mechanism 42 is situated at the first and second ends 46, 48 and is held by the first and second loops 56, 58. The closure mechanism 42 can take different forms in different embodiments. With reference to FIGS. 2 and 3, in the example presented here, the closure mechanism 42 is a T-bolt type tightening assembly. The closure mechanism 42 includes a trunnion 72 and a fastener 74 with a T-bolt 76 and a nut 78. The trunnion 72 has nubs projecting on opposite sides that are inserted into the first loop 56 of the band 40 and are able to pivot therein. In similar fashion, the T-bolt 76 has a head portion projecting on opposite sides and inserted into the second loop 58. A shank portion of the T-bolt 76 is inserted through a bore of the trunnion 72, and the nut 78 is threaded on the shank portion and torqued and tightened against the trunnion 72. Still, the closure mechanism 42 can be of other types in other embodiments.

The bearing assembly 44 generates rolling friction with the first and second tubular body end flanges 12, 14 amid tightening of the v-clamp 10 thereover and therearound. When assembled and installed, the bearing assembly 44 is disposed at a radially-inboard side of the band 40 and is nested within the band 40 at the underside thereof, as perhaps demonstrated best by FIG. 2. The bearing assembly 44 can take different forms in different embodiments. With reference to FIGS. 2-4, in the example presented here, the bearing assembly 44 is a ball bearing type bearing assembly. The bearing assembly 44 includes a first set of bearings 80, a second set of bearings 82, and a cage 84. Since this example is of the ball bearing type, the first set of bearings 80 is a first set of ball bearings 86 with multiple individual ball bearings 88. Each ball bearing 88 is seated in a corresponding hole residing in the cage 84. Likewise, the second set of bearings 82 is a second set of ball bearings 90 with multiple individual ball bearings 92. Each ball bearing 92 is seated in a corresponding hole residing in the cage 84. Still, in another embodiment that lacks specific example by the figures, the bearing assembly could be of the roller bearing type with a set of individual cylindrical rollers.

When assembled and installed, the first set of bearings 80 is disposed near the first axial end 50 of the band 40 at a location that is radially-inboard of the basewall 60 and axially-inward of the first sidewall 62. At this location, the first set of bearings 80 is positioned so that each of its individual bearings (in this case, ball bearings 88) makes surface-to-surface contact with the first outer surface 20 of the first end flange 12. Similarly, the second set of bearings 82 is disposed near the second axial end 52 of the band 40 at a location that is radially-inboard of the basewall 60 and axially inward of the second sidewall 64. At this location, the second set of bearings 82 is positioned so that each of its individual bearings (in this case, ball bearings 92) makes surface-to-surface contact with the second outer surface 28 of the second end flange 14. The first and second sets of bearings 80, 82 span substantially fully around the circumferential extent of the band 40 taken between the band's first end 46 and the band's second end 48.

The cage 84 carries and captures the first set of bearings 80 and the second set of bearings 82. When assembled and installed, the cage 84 is disposed at the radially-inboard side of the band 40 and is nested at the underside and in the channel 70 of the band 40. In the example of the figures, the cage 84 has a first end 94 at one of its circumferential terminations, and has a second end 96 at its other and opposite circumferential termination. At its axial boundaries, the cage 84 has a first axial end 98 and a second axial end 100. For receipt of the individual ball bearings 88 of the first set of ball bearings 86, the cage 84 has a first set of holes 102 defined in its body; and for receipt of the individual ball bearings 92 of the second set of ball bearings 90, the cage 84 has a second set of holes 104 defined in its body. As perhaps demonstrated best in FIG. 3, the first set of holes 102 includes multiple individual holes set apart from one another around the circumferential extent of the cage 84. Likewise, the second set of holes 104 includes multiple individual holes set apart from one another around the circumferential extent of the cage 84, but on an opposite side of the cage 84 relative to the first set of holes 102. The first and second sets of holes 102, 104 reside on opposite sides of the cage's body, and hence position the first and second set of ball bearings 86, 90 on opposite sides of the cage 84 for ready and respective engagement with the first and second tubular body end flanges 12, 14.

As described, the v-clamp 10 generates rolling friction with the underlying first and second tubular body end flanges 12, 14 when tightened down thereat via the closure mechanism 42. This is in contrast to sliding friction previously generated by past clamps of somewhat similar type, which is altogether absent with use of the v-clamp 10. It has been found that the rolling friction generated has a lower frictional force compared to the sliding friction that would be generated under similar conditions and in similar applications. The minimized frictional force of the v-clamp 10 provides a clamping force that is more evenly and uniformly distributed fully around the circumferential extent of the v-clamp 10, resulting in a tightening action that is more efficiently and effectively transferred into clamping force. Increased generated friction, it has been determined, inhibits the transfer of tightening action to clamping force. The rolling friction is generated between the first and second sets of bearings 80, 82 and the first and second tubular body end flanges 12, 14. In the embodiment of the figures, and with particular reference to FIG. 4, outer surfaces of the ball bearings 88 make surface-to-surface rolling contact directly against the first outer surface 20 of the first end flange 12, and particularly against the axially-outward facing section 24. A first rolling interface 106 is established therebetween as the ball bearings 88 experience a rolling movement against the first end flange 12 amid the tightening action. At the band 40, the inner surface 54 makes surface-to-surface contact directly with the outer surfaces of the ball bearings 88. In a similar way, outer surfaces of the ball bearings 92 make surface-to-surface rolling contact directly against the second outer surface 28 of the second end flange 14, and particularly against the axially-outward facing section 32. A second rolling interface 108 is established therebetween as the ball bearings 92 experience a rolling movement against the second end flange 14 amid the tightening action. At the band 40, the inner surface 54 makes surface-to-surface contact directly with the outer surfaces of the ball bearings 92.

Furthermore, the v-clamp 10 can be more readily arranged for servicing post-installation and in application, if called for, than past clamps. Easy access to the closure mechanism 42 may be provided by untightening the closure mechanism 42 partially and rotating the v-clamp 10 from a first circumferential position (e.g., its installed rotational position) to a second circumferential position (e.g., its servicing rotational position). The minimized rolling frictional force generated in the midst of rotation is more readily surpassed and hence facilitates these actions.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A v-clamp for a pair of tubular body end flanges, comprising:
   a band extending circumferentially from a first end to a second end;
   a closure mechanism situated adjacent said first and second ends, said closure mechanism having a fastener;
   a set of bearings disposed at a radially-inboard side of said band, wherein said set of bearings is a set of ball bearings; and
   a cage that captures said set of ball bearings and that is disposed at said radially-inboard side of said band;
   wherein the v-clamp is configured such that, in the midst of tightening said band via said closure mechanism on the pair of tubular body end flanges, said set of ball bearings makes surface-to-surface rolling contact with outer surfaces of the pair of tubular body end flanges.

2. The v-clamp of claim 1, wherein said band has a first sidewall and a second sidewall, said first and second sidewalls extending radially-inboard of a basewall of said band.

3. The v-clamp of claim 2, wherein said set of ball bearings is disposed radially-inboard of said basewall and axially-inward of said first sidewall and axially-inward of said second sidewall.

4. The v-clamp of claim 1, wherein said set of ball bearings includes a first set of ball bearings disposed adjacent a first axial side of said band and includes a second set of ball bearings disposed adjacent a second axial side of said band.

5. The v-clamp of claim 1, wherein said set of ball bearings makes surface-to-surface contact with an inner surface of said band.

6. The v-clamp of claim 1, wherein said set of ball bearings spans a circumferential extent at said radially-inboard side of said band that at least partially overlaps with a full circumferential extent of said band taken between said first and second ends of said band.

7. A joint assembly comprising the v-clamp of claim 1 and further comprising a first tubular body and a second tubular body, said first tubular body having one of the pair of tubular body end flanges and said second tubular body having the other of the pair of tubular body end flanges.

8. The joint assembly of claim 7, wherein, in the midst of tightening said band via said closure mechanism on the pair of tubular body end flanges, rolling friction is generated between the v-clamp and the pair of tubular body end flanges, and sliding friction between the v-clamp and the pair of tubular body end flanges is absent.

9. A v-clamp for a pair of tubular body end flanges, comprising:
 a band extending circumferentially from a first end to a second end, said band having a basewall, a first sidewall extending from said basewall, and a second sidewall extending from said basewall, said basewall and said first and second sidewalls generally establishing a channel at an underside of said band;
 a closure mechanism situated adjacent said first and second ends, said closure mechanism bringing said first and second ends toward and away from each other in order to tighten and loosen the v-clamp; and
 a bearing assembly disposed at said channel of said band, said bearing assembly including a first set of bearings, a second set of bearings, and a cage carrying said first set of bearings and carrying said second set of bearings;
 wherein, in assembly, a first surface-to-surface contact is established between said first set of bearings and an inner surface of said band, and a second surface-to-surface contact is established between said second set of bearings and said inner surface of said band;
 wherein the v-clamp is configured such that, in use, a third surface-to-surface contact is established between said first set of bearings and a first outer surface of a first end flange, and a fourth surface-to-surface contact is established between said second set of bearings and a second outer surface of a second end flange.

10. The v-clamp of claim 9, wherein said first set of bearings is a first set of ball bearings, and said second set of bearings is a second set of ball bearings.

11. The v-clamp of claim 9, wherein said first sidewall depends radially-inboard and axially-outward of said basewall and relative to said basewall, and said second sidewall depends radially-inboard and axially-outward of said basewall and relative to said basewall.

12. The v-clamp of claim 11, wherein said band has a first terminal end region depending axially-inward of said first sidewall and relative to said first sidewall, and said band has a second terminal end region depending axially-inward of said second sidewall and relative to said second sidewall, said first and second terminal end regions facilitating location of said bearing assembly at said channel of said band.

13. A joint assembly comprising the v-clamp of claim 9 and further comprising a first tubular body and a second tubular body, said first tubular body having the first end flange and said second tubular body having the second end flange, a gasket being seated in a channel of at least one of the first end flange or the second end flange and establishing a seal between the first and second end flanges.

14. A v-clamp comprising:
 a band extending circumferentially from a first end to a second end, said band having a basewall, a first sidewall depending radially-inboard and axially-outward of said basewall, a second sidewall depending radially-inboard and axially-outward of said basewall, a first terminal end region depending axially-inward of said first sidewall, and a second terminal end region depending axially-inward of said second sidewall;
 a closure mechanism situated adjacent said first and second ends, said closure mechanism having a fastener; and
 a bearing assembly disposed at an underside of said band and at least partly held thereat via said first and second terminal end regions, said bearing assembly including a first set of bearings, a second set of bearings, and a cage carrying said first set of bearings and carrying said second set of bearings.

15. The v-clamp of claim 14, wherein a first surface-to-surface contact is established between said first set of bearings and an inner surface of said first sidewall, and a second surface-to-surface contact is established between said second set of bearings and said inner surface of said second sidewall.

16. The v-clamp of claim 14, wherein said first set of bearings is a first set of ball bearings, and said second set of bearings is a second set of ball bearings.

* * * * *